United States Patent
Gumm

(10) Patent No.: US 6,384,784 B1
(45) Date of Patent: May 7, 2002

(54) DIRECTION FINDER SYSTEM USING SPREAD SPECTRUM TECHNIQUES

(75) Inventor: Linley F. Gumm, Beaverton, OR (US)

(73) Assignee: Tektronix, Inc, Beaverton, OR (US)

( * ) Notice: Subject to any disclaimer, the term of this patent is extended or adjusted under 35 U.S.C. 154(b) by 0 days.

(21) Appl. No.: 09/755,842

(22) Filed: Jan. 5, 2001

(51) Int. Cl.[7] .............................. G01S 5/04; H01Q 3/26
(52) U.S. Cl. ....................................... 342/442; 342/372
(58) Field of Search ................................ 342/442, 372, 342/383

(56) References Cited

U.S. PATENT DOCUMENTS 3,999,182 A * 12/1976 Moeller et al. ............. 342/372
5,592,179 A * 1/1997 Windyka .................... 342/157

OTHER PUBLICATIONS

Frederick Emmons Terman, ScD. and Joseph Mayo Pettit, Pd.D., "Electronic Measurements", Second Edition, McGraw–Hill Book Company, Inc. 1952, p. 465–467.

Richard C. Johnson and Henry Jasik, Editors, "Antenna Engineering Handbook", Second Edition, McGraw–Hill Book Company, pp. 39–12 to 39–16.

* cited by examiner

Primary Examiner—Thomas H. Tarcza
Assistant Examiner—Fred H Mull
(74) Attorney, Agent, or Firm—Francis I. Gray

(57) ABSTRACT

A direction finder using spread spectrum techniques has an array of antennas in a predetermined configuration for receiving a signal from a modulated, or interfering, signal source. The individual outputs from each antenna are input to respective direct sequence spread spectrum modulators where each is multiplied by a unique pseudo-random number (PRN) code, unique either in value or in time relationship. The spread spectrum outputs are summed and the summed output is demodulated and digitized to produce a digitized intermediate frequency (IF) signal. The digitized IF signal is processed by a digital signal processing (DSP) engine to determine relative phase or time of arrival of the signal from the modulated signal source at each antenna relative to one of the antennas used as a reference. The relative phases or times of arrival and the predetermined configuration of the antenna array are then used to estimate the direction to the modulated signal source with a high degree of accuracy.

4 Claims, 2 Drawing Sheets

DIRECTION FINDER SYSTEM USING SPREAD SPECTRUM TECHNIQUES

BACKGROUND OF THE INVENTION

The present invention relates to direction finder systems, and more particularly to a direction finder system using spread spectrum techniques.

Cellular telephone system operators, as an example, spend a lot of time looking for sources of interference. A typical approach is to use a sensitive receiver/spectrum analyzer coupled with a directional antenna. Guided by either a magnitude display or an audible tone amplitude, the directional antenna is moved to maximize the received signal from the interfering source, thus determining the signal's direction of arrival. This method has the advantage of simplicity, using readily available hardware. However its disadvantage is the limited accuracy of the direction measurement due to the width of the main pattern lobe of the directional antenna.

Another well known approach is to use two or more antennas and compare the relative phase or time of arrival of the interfering signal at each antenna. By knowing the relative phases or times of arrival and how the array is constructed, the direction of arrival of the interfering signal as it sweeps across the antennas may be inferred, as is described in "Electronic Measurements" 2d. Ed. By McGraw-Hill Book Company (1952) by Terman and Pettit at pages 465–467. In some systems the two or more antennas are mounted in a fixed relationship with each other and are physically turned to equalize the times of arrival or phases of the signal being measured, thus pointing the way to the interference source. In other systems the antennas are fixed.

The problem with a multiple antenna approach is that some form of receiver or down converter is required for each antenna/channel. Each receiver's characteristics need to be matched to the others to achieve accuracy. It may require very heroic adjustment to multiple receivers' frequency response and gain characteristics to track.

In the three decade period around World War II a scheme was published that used one receiver and its input was electronically switched from antenna to antenna to allow the use of one receiver for all antennas, eliminating the receiver matching problem. The single receiver was in effect multiplexed between the antennas. The receiver's output was then demultiplexed and used to drive a cathode ray tube (CRT) display to create an instantaneous direction indication system. If a signal with a coherent carrier, such as amplitude modulation, is measured, it is feasible through the use of averaging or phase lock techniques to make antenna-to-antenna carrier phase comparisons to determine the time of arrival of the signal. However, with modern digitally modulated signals, especially spread spectrum signals, the instantaneous phase of the RF carrier is hidden by the modulation. Simultaneous measurements of the signal at two antennas are required.

Another approach was to switch the receiver between two or more, typically three or four, antennas at an audio rate. The down converted signal was frequency modulation (FM) detected and the frequency shift, the rate of change of phase as a function of time, thus created was measured to determine the signal's arrival angle. This technique is very useful with signals with a relatively coherent carrier, such as amplitude modulation or narrow band frequency modulation. This technique, however, does not yield good results when digital modulation techniques obscure the carrier phase. This is especially true when spread spectrum techniques are used. In that case care is taken to make the carrier appear noise-like.

See "Antenna Engineering Handbook" 2d. Ed., McGraw-Hill Book Company (1961) by Johnson and Jasik at pages 39-12 through 39-16, especially FIG. 39-10, for descriptions of the above-mentioned types of direction finders.

What is desired is a multi-channel direction finder system that accurately indication the direction to an interfering signal source where the signal is a digitally modulated suppressed carrier signal.

BRIEF SUMMARY OF THE INVENTION

Accordingly the present invention provides a direction finder system using spread spectrum techniques that modulates each antenna channel with a PRN code unique in value or time. The encoded channels are summed and processed by a single demodulator and digitized. The resulting IF signal is analyzed by a digital signal processing engine using corresponding PRN code values or times to determine a phase or time of arrival of each channel relative to a reference channel. From the phases and/or times of arrival an accurate direction to the signal source is determined.

The objects, advantages and other novel features of the present invention are apparent from the following detailed description when read in light of the appended claims and attached drawing.

DETAILED DESCRIPTION OF THE INVENTION

Figure 1:
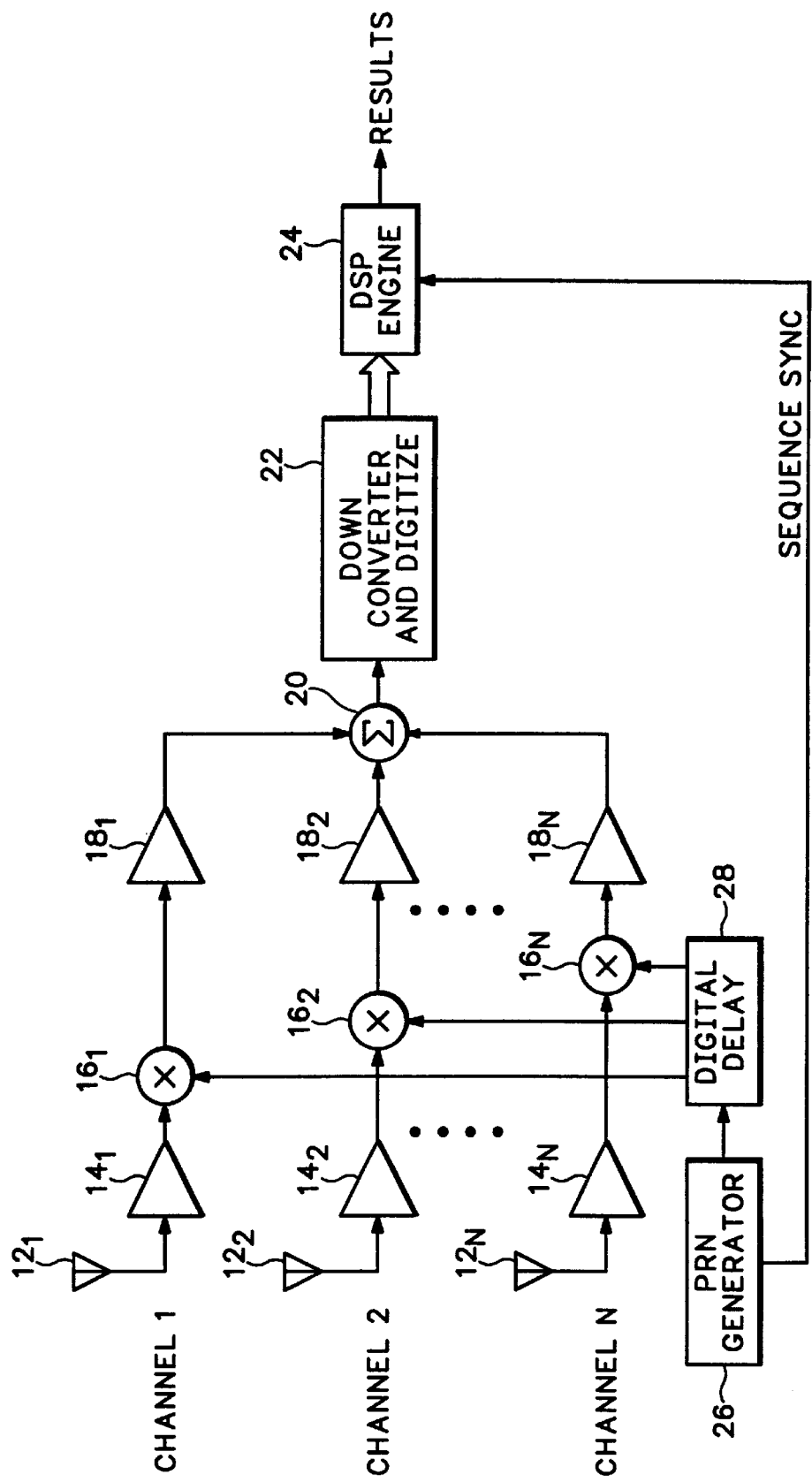
FIG. 1 is a block diagram view of a direction finder system using spread spectrum techniques according to the present invention.

Referring now to FIG. 1 N antennas 12, N≧2, are arranged in a regular array. Depending upon the requirements the antennas 12 may be placed in any number of formats, with configuration in a line or a circle or a rectangle being typical. If necessary to maintain noise figure each antenna channel has a pre-amplifier 14 that is a broadband amplifier with a minimum of tuning elements. Each antenna signal is then passed through a direct sequence spread spectrum modulator 16, with each signal being encoded with a different pseudo-random number (PRN) code or with the same PRN code delayed a different amount for each antenna channel. Each signal may then be passed through a buffer amplifier 18 before being input to a summation circuit 20. The summed signal is input to a down converter and digitizer 22 and then sent to a digital signal processor (DSP) engine 24 for analysis. The PRN codes are generated by a PRN generator 26. In the case of a single PRN code, it is input to a delay circuit 28 and applied to the respective modulators 16 in time sequence.

Figure 2:
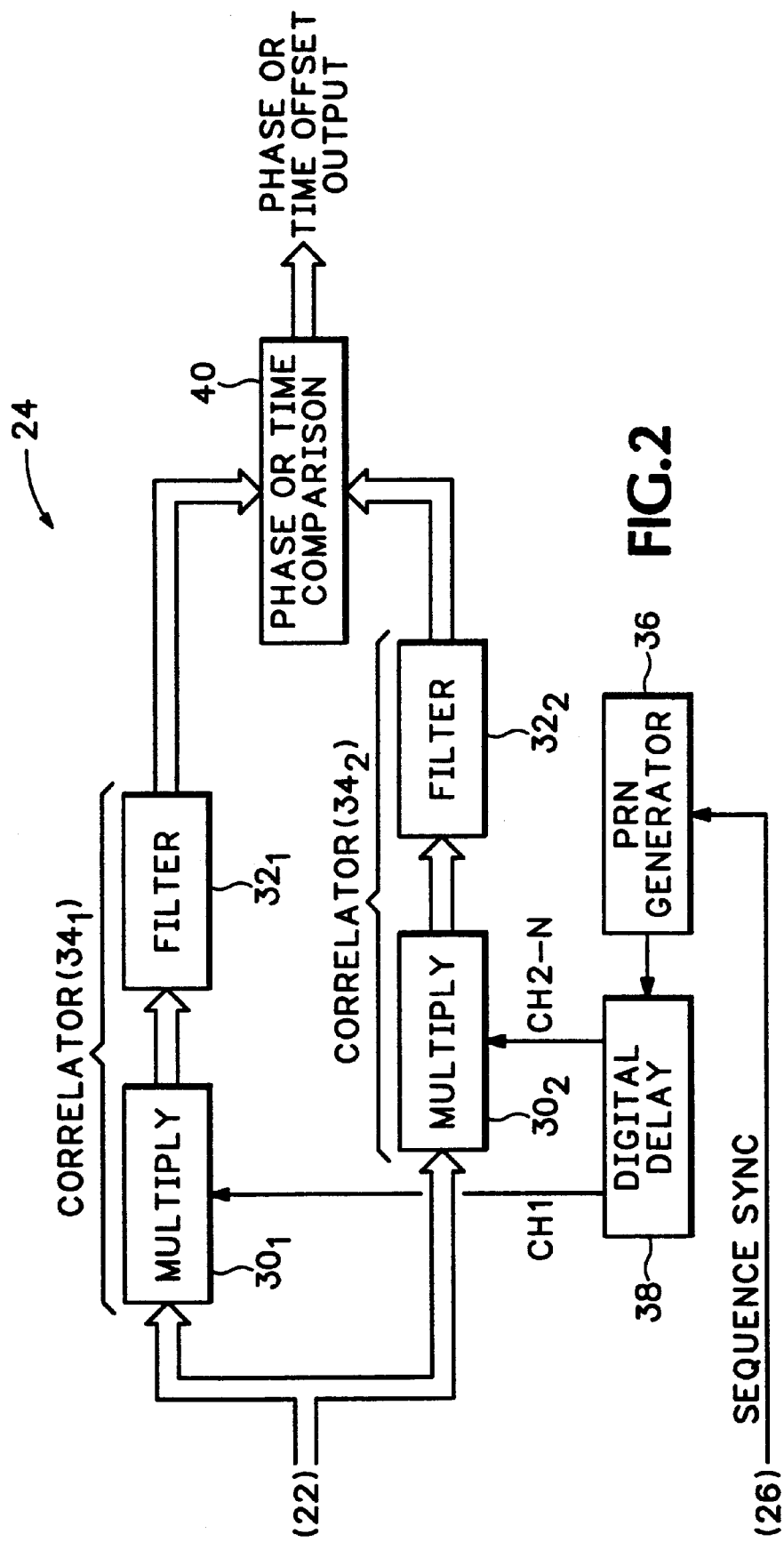
FIG. 2 is a flow diagram view of a digital signal processing engine for the direction finding system of FIG. 1.

As shown in FIG. 2 the digital intermediate frequency (IF) signal from the down converter and digitizer 22 is applied to at least two multipliers 30 in series with respective filters 32 which form respective correlators 34. Each of the antenna signals may be extracted from the ensemble by multiplying and filtering it with a recreated version of the PRN code that is in correct time sync. The sequence sync signal from the array PRN generator 26 is applied to an analysis PRN generator 36, which makes the correlation much easier, but is not necessary for the process to work correctly. The first multiplier $30_1$ is sent a PRN code from the analysis PRN generator 36 via a digital delay 38 that is time synchronous with the encoding signal in the first antenna channel, plus the delay encountered in the down conversion process. The second multiplier $30_2$ is then sent an appropriate PRN code signal to decode the 2-Nth channels in turn. After each antenna signal is decoded, its phase or time of arrival is compared in a comparator 40 with that of the first antenna channel. The difference in time or phase determines the relative time of arrival of each of the 2-Nth signals. After all N channels are measured, an estimate of the signal's direction of arrival may be made based on the configuration of the antennas 12.

Typically it is possible to use delayed portions of the same PRN sequence to encode each signal. This is made easier since many sequences exist that have very small auto correlation coefficients for non-aligned codes. All that needs to be done is for the time delay between each PRN sample to exceed that required for the signal to travel across the antenna array. For other cases completely different codes may be used. The chirp rate of the code is chosen to spread the incoming signals across the full signal bandwidth of the down converter and digitizer 22.

Thus the present invention provides a direction finder system using a spread spectrum technique that modulates each antenna channel with a PRN code unique in value or time, the channels are summed and processed by a single demodulator/digitizer, and the resulting digital IF signal is analyzed by a DSP engine using the corresponding unique PRN codes to determine a phase or time of arrival of each channel with respect to channel one from which the direction to the signal source is accurately determined.

What is claimed is:

1. A method of finding a direction to a modulated signal source comprising the steps of:

multiplying each of a plurality of signals from an antenna array receiving a signal from the modulated signal source with a unique pseudo-random number code;

summing the resulting multiplied signals;

demodulating the summed signals; and analyzing the summed signals to determine relative phase or time of arrival of the signal from the modulated signal source at each antenna of the antenna array with respect to one of the antennas as a reference, the relative phases or times of arrival and a known configuration of the antenna array being used to determine a direction to the modulated signal source.

2. The method as recited in claim 1 wherein the unique pseudo-random number code comprises one selected from the group consisting of a plurality of different pseudo-random number codes, one for each antenna of the antenna array, and a single pseudo-random number code delayed by a different amount for each antenna of the antenna array.

3. A system for finding the direction to a modulated signal source comprising:

a plurality of antennas in a predetermined configuration;

means for multiplying an output from each antenna in response to a signal received from the modulated signal source with a unique pseudo-random number code to produce a spread spectrum output for each antenna;

means for summing the spread spectrum outputs to produce a summed output;

means for demodulating the summed output to produce a digital intermediate frequency signal; and means for analyzing the digital intermediate frequency signal to determine relative phase or time of arrival of the signal from the modulated signal source at each antenna with respect to a reference one of the antennas from which a direction to the modulated signal source is estimated.

4. The system as recited in claim 3 wherein the unique pseudo-random number code comprises one selected from the group consisting of a plurality of different pseudo-random number codes, one for each antenna of the antenna array, and a single pseudo-random number code delayed by a different amount for each antenna of the antenna array.

* * * * *